(No Model.)
T. LUDLUM & C. I. PECK.
Dinner Pail.
No. 237,401.  Patented Feb. 8, 1881.
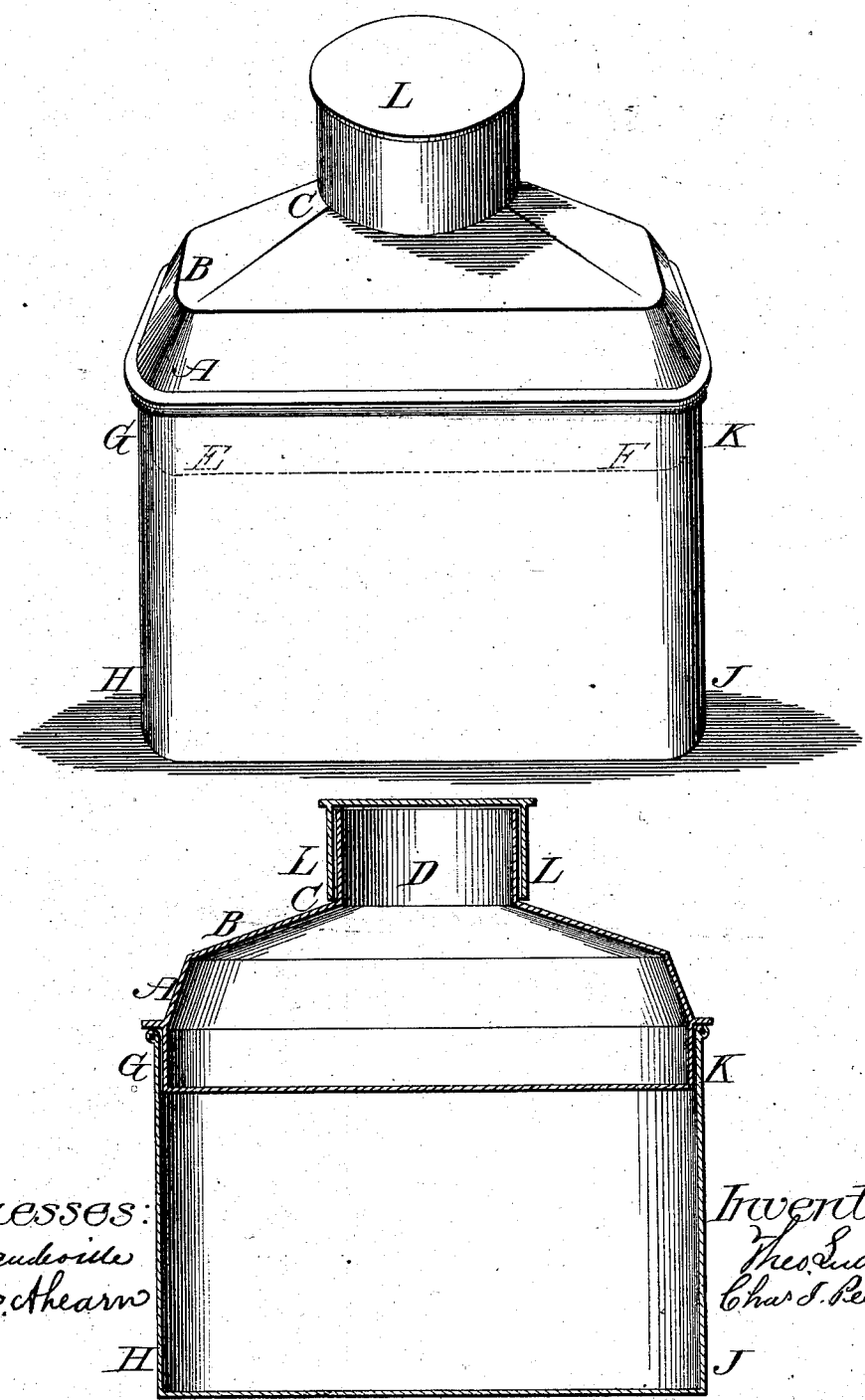

UNITED STATES PATENT OFFICE.

THEODORE LUDLUM AND CHARLES I. PECK, OF PORT JERVIS, NEW YORK.

DINNER-PAIL.

SPECIFICATION forming part of Letters Patent No. 237,401, dated February 8, 1881.

Application filed August 2, 1880. (No model.)

*To all whom it may concern:*

Be it known that we, THEODORE LUDLUM and CHARLES I. PECK, citizens of the United States, residing at Port Jervis, in the county of Orange and State of New York, have invented an Improvement in Dinner-Pails for the use of railway-employés, mechanics, and laboring-men, of which the following is a specification, reference being had to the accompanying drawings, forming part thereof, in which—

Figure 1 represents the completed dinner-pail in perspective, and Fig. 2 represents a vertical section of the same.

The leading feature of our improvement consists in the receptacle for coffee, tea, or other liquids, as shown in the drawings, A and B forming the top, united at C with neck D, which serves the purpose of an outlet, as well as to hold the cup L in position for carrying. From the base of cover, at A, is connected a pit that goes inside of pail G H J K, and is shown by the dotted lines E and F, the whole forming a complete dinner-pail.

Heretofore dinner-pails have been made similar to the one shown in drawings, but with straight or sloping sides from A to B, and with a perfectly flat top from B to C, and connected at C with neck D, as described above.

Our improvement consists in so cutting and forming from one or more pieces of tin or other metal, or stamping, pressing, striking up, or raising with a hammer from one or more pieces of tin or other metals, the top of the coffee-can, A, B, and C, so as to form the Mansard shape, as shown in the drawings, having a straight or flaring side from A to B and a gradual rise or flare from B to C, said improvement being for the purpose of allowing the receptacle for coffee, tea, or other liquids to be more readily emptied of its contents, and also to be more easily and perfectly cleansed.

Having fully described our invention, what we desire to claim and secure by Letters Patent is—

1. The combination of dinner-pail and cover, having the cover made to hold coffee, tea, or other liquids, and of shape shown in drawings at A, B, and C, made from one piece of tin or other metal, by cutting, forming, and soldering or brazing together so as to make the sides from A to B straight or flaring and a gradual rise or pitch from B to C.

2. The combination of dinner-pail and cover, having the cover made to hold coffee, tea, or other liquids, and of shape shown in drawings at A, B, and C, made from one piece of tin or other metal, by stamping, pressing, or striking up or raising with hammers so as to make the sides from A to B straight or flaring and from B to C with a gradual rise or pitch.

3. The whole top of coffee, tea, or other liquid receptacle, made from one or more pieces of tin or other metal, by cutting and soldering or brazing, or stamped, pressed, struck up, or raised with hammers to the shape as shown by drawings, and substantially as described.

THEODORE LUDLUM.
CHARLES I. PECK.

Witnesses:
JOS. H. MANDEVILLE,
JOHN AHEARN.